US005755990A

United States Patent [19]

Lamberti et al.

[11] Patent Number: 5,755,990

[45] Date of Patent: May 26, 1998

[54] SEQUESTRANT COMPOSITIONS

[75] Inventors: Vincent Lamberti, Upper Saddle River, N.J.; Alice P. Hudson, Jupiter, Fla.

[73] Assignee: U.S. Borax Inc., Valencia, Calif.

[21] Appl. No.: 638,266

[22] Filed: Apr. 26, 1996

Related U.S. Application Data

[63] Continuation-in-part of Ser. No. 459,935, Jun. 2, 1995, abandoned.

[51] Int. Cl.[6] .......... C02F 5/02

[52] U.S. Cl. .......... 252/175; 510/465; 510/471

[58] Field of Search .......... 510/465, 471; 252/175

[56] References Cited

U.S. PATENT DOCUMENTS

| | | | |
|---|---|---|---|
| 3,954,858 | 5/1976 | Lamberti et al. | 260/535 P |
| 4,000,083 | 12/1976 | Heesen | 252/135 |
| 5,135,681 | 8/1992 | Carter et al. | 252/389.62 |
| 5,332,519 | 7/1994 | Mazzola | 252/174 |

FOREIGN PATENT DOCUMENTS

| | | |
|---|---|---|
| 99202 | 10/1961 | Netherlands . |
| 1389732 | 4/1975 | United Kingdom . |

OTHER PUBLICATIONS

Mehltretter et al., Industrial and Engineering Chemistry, vol. 45, No. 12, Dec. 1953, pp. 2782–2784.

Wilham et al., Journal of American Oil Chemist's Society, vol. 48 (1971), pp. 682–683.

Heesen, Chemical Abstracts, vol. 81, 176040 (1974).

Netherlands Patent Appln. 72 15,180.

VanDuin, Martin, et al., "Studies on Borate Esters, Part 5. The System Glucarate–Borate–Calcium(II) as Studied by $^{1}H$, $^{11}B$, and $^{13}C$ Nuclear Magnetic Resonance Spectroscopy", J. Chem. Soc. Perkin Trans. II, pp. 473–478 (1987).

Quill, K. and Robertson, B.W., "The Saccharate–Perborate System—A Combined Builder/Bleach for Heavy Duty Detergents", Proceedings of 3rd CESIO International Surfactants Congress, London, England, Jun. 1992.

Greenhill–Hopper, M.J., "TheEffect of Borate Upon the Basic Detergency Process", Proceedings of 36th Int'l Detergency Conference, Germany, Apr. 1994.

Gerling, K.–G., "Kalinmlactobionat als neuer Cobuilder in Waschmittelformulierungen", SÖFW–Journal, 121 (II), pp. 806–812 (Oct. 1995)—With Translation.

"Borax as a Detergent Additive", Agglomerations, pp. 2–5, Jul./Aug. 1995.

Greenhill–Hooper et al., "Detergent Builder Properties of Borate", Proceedings of 6th Congress of the Comitato Italiano dei Derivati Tensiativo (CID), Rome, Italy, Oct. 18–20, 1995.

"Borates and Polyhydroxycarboxylates as Builders", Agglomerations, pp. 3–4 (Jan./Feb. 1996).

Greenhill–Hooper et al., "Detergent Builder Functionalities of Borate", INFORM, vol. 7, No. 1, pp. 30–37 (Jan. 1996).

Quill, K. "Perborate–Sugar Acid Systems: Combined Builder/Bleach Systems for Heavy Duty Detergents," INFORM, vol. 4, No. 4 (Apr. 1993), p. 530, Abstract No. QQ2.

Greenhill–Hooper, M. J., "Dye/Soil Stabilization in Detergency–Borate Effects," INFORM, vol. 5, No. 4, April 1994), p. 546, Abstract F.

Greenhill–Hooper, M. J., "The Detergent Builder Funtionalities of Borate,"INFORM, vol. 6, No. 4 (Apr. 1995), p. 491, Abstract G.

Greenhill–Hooper, M. J., "Detergent Builder Properties of Borate," Comunicaciones presentadas a la XXV Jornadas Del Comite Espanol de la Detergencia, CED Meeting, Barcelona, Spain, May 1994.

*Primary Examiner*—Christine Skane
*Assistant Examiner*—John R. Hardee
*Attorney, Agent, or Firm*—James R. Thornton

[57] ABSTRACT

Sequestrant compositions comprising combinations of an alkali metal or ammonium borate with an adduct formed by reaction of an α, β unsaturated polycarboxylic acid with a mono- or dicarboxylated sugar, in which the adduct has at least two hydroxy groups in a vicinal configuration. The sequestrants can be used to complex alkaline earth and transition metal ions and are especially useful for complexing calcium and magnesium in aqueous laundry solutions. They also are effective for soil dispersion and for inhibiting the deposition of soil on fabric.

5 Claims, No Drawings

SEQUESTRANT COMPOSITIONS

This invention relates to sequestrant compositions and more particularly, this invention relates to novel sequestrant compositions for complexing alkaline earth, transition and post-transition metal ions such as calcium, magnesium, manganese, copper, zinc and iron ions. This application is a continuation-in-part of our copending application Ser. No. 08/459,935 filed Jun. 2, 1995, now abandoned.

BACKGROUND OF THE INVENTION

Sequestration of ions is commonly used in various aqueous solutions to hold potentially interfering ions in solution so as to avoid problems such as precipitation or discoloration. Aqueous laundry solutions, such as laundry detergent or bleaching solutions, are especially benefited by the presence of sequestrants. Phosphates have been the most commonly used additives in laundry compositions, both as sequestrants and builders. However, concerns about the adverse effect of phosphates on the environment have led to extensive searches for effective replacements for the phosphates. Zeolites have been used as partial or total replacements for phosphates in laundry detergent compositions but have not been as effective as desired. More recently, various organic sequestrants have been proposed, including organic acids, such as the sugar acids. Mehltretter et al., Industrial and Engineering Chemistry, Vol. 45 (1953), pages 2782–2784, compares the sequestering action of various sugar acids such as the alkali metal glucarate or saccharate, glucoheptonate and gluconate. Wilham and Mehltretter, Journal of the American Oil Chemists' Society, 48 (1971), pages 682–3, evaluated the sugar acids and concluded that they were poor builders for alkaline detergent formulations, with not much chelating effect at pH 10. Lamberti et al., U.S. Pat. No. 3,954,858, describe a group of organic sequestrant builders for use in detergent compositions which can be prepared by an intramolecular Michael-type reaction. The compounds can be used either as the sole builder, or where desired, can be used in conjunction with other builders, such as the phosphates, nitrilotriacetate, polyacrylates, ether polycarboxylates, citrates and starch or cellulose derived polycarboxylates. Dutch Patent No. 99202 proposes the use of a mixture of one or more organic compounds having at least two vicinal OH groups, such as the gluconates, with boric acid or borates as sequestrants for water softening. Heesen U.S. Pat. No. 4,000,083 also shows use of combinations of boric acid and borates with organic compounds having two vicinal hydroxy groups as sequestering agents. The compounds of Heesen have one or two carboxylic acid groups in the molecule, at least one being at a terminal position and adjacent to one of the hydroxy groups. Quill et al, Proceedings of the 3rd World Surfactants Congress (CESIO), London (1992) pages 17–31, report studies on the effectiveness of the saccharate-perborate system as a combined builder and bleach system for detergent formulations. Van Duin et al, Journal of the Chemical Society Perkin Transactions II (1987), pages 473–478, report on the structure and stability of borate esters formed in aqueous solutions of the glucarate-borate-calcium system.

SUMMARY OF THE INVENTION

This invention provides improved sequestrant compositions comprising a combination of an alkali metal borate or ammonium borate with a select class of polycarboxylic acids or polycarboxylates having at least two vicinal hydroxy groups and at least three carboxylic acid or carboxylate groups. The combination of borate and polycarboxylate of this invention possesses superior sequestering activity in aqueous laundry compositions such as detergents and bleaching compositions.

One of the desirable features of the combinations of this invention is that their affinity for metal ions decreases rapidly upon dilution or lowering of pH such as that which occurs when wash water is discharged into waste streams. In this way, any tendency of the sequestering system to transport heavy metal ions is rapidly negated. Further, the biodegradable nature of the organic polycarboxylic component of the combination ensures the final destruction of the remaining chelating capacity of the system.

In addition to sequestration, the borate-polycarboxylate combinations of this invention are also useful for improving soil suspension and anti-redeposition properties. The cumulative effect of these properties is to provide improved detergency and unexpected usefulness as a laundry detergent builder.

DESCRIPTION OF THE INVENTION

The sequestrant compositions of this invention comprise (1) a borate selected from the group consisting of the alkali metal borates and ammonium borates and (2) at least one compound of the formula:

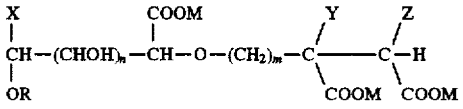

where R is H or

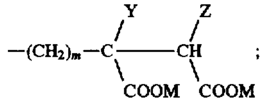

X is H or COOM; m is 0 or 1; n is an integer of from 1 to 4; M is hydrogen or an alkali metal or ammonium cation; and Y and Z are independently selected from the group consisting of H, lower alkyl containing 1 to 4 carbon atoms, —COOM and —$CH_2$COOM, said compound having at least two hydroxy groups in a vicinal configuration, wherein the mole ratio of said compound to said borate is about 0.1 to about 5:1. Since the compound must have at least two vicinal hydroxy groups, when n is 1, R must be H. Also, when X is H, R must be H.

The borate can be any of the well-known water-soluble alkali metal and ammonium borates, such as the sodium borates, including sodium tetraborate pentahydrate, sodium tetraborate decahydrate, sodium perborate monohydrate, sodium perborate tetrahydrate and sodium metaborate tetrahydrate, as well as the corresponding potassium borates. Ammonium borates, including the substituted ammonium borates, such as the alkanol ammonium borates (preferably having about 2–9 carbon atoms), can also be used in the compositions.

The organic compounds comprising the second component of the sequestrant compositions of this invention are generally described by Lamberti et al in U.S. Pat. No. 3,954,858. They can be prepared by an intramolecular Michael-type reaction in which an α, β unsaturated polycarboxylic acid is reacted with a sugar acid selected from the group consisting of the mono- and dicarboxylated sugars in the presence of at least one divalent cation. After the reaction is complete the divalent cation used to promote the reaction is exchanged for an alkali metal cation, such as sodium and potassium, or the ammonium and substituted ammonium cations, including mono-, di-, and tri-alkanolammonium. The resultant compounds may be described as adducts and are characterized by having at least two vicinal hydroxy groups and at least three carboxylic acid or carboxylate groups.

Examples of preferred α, β unsaturated polycarboxylic acids used in the preparation of the compounds are maleic acid, itaconic acid, citraconic acid and aconitic acid. Examples of preferred sugar acids are gluconic acid, glucoheptanoic acid and glucosaccharic acid (also known as glucaric acid and saccharic acid), mannoic acid and mannosaccharic acid. The preferred reactants are those derived from the naturally occurring hexoses and pentoses, such as d-glucose, d-galactose, d-mannose, l-arabinose and d-xylose, as well as the heptoses which can be obtained synthetically from the hexoses using the Kiliani cyanohydrin synthesis. Both the optically active (i.e. d- or l- ) or optically inactive (d,l) forms of the saccharide reactants may be used.

To prepare the compounds the two reactants are neutralized with at least one alkaline earth or divalent transition metal oxide or hydroxide of which calcium oxide or hydroxide, strontium oxide or hydroxide, barium oxide or hydroxide, magnesium oxide or hydroxide, and zinc oxide or hydroxide are examples.

Calcium oxide and calcium hydroxide are preferred. The reaction is conveniently carried out in an aqueous medium in which the pH is adjusted with an excess of the divalent metal hydroxide or preferably with an alkali metal hydroxide such as sodium hydroxide to about 8 to about 12.5 and preferably to between about 11 and 12.

The reaction takes place conveniently at about the reflux temperature of the mixture, which is generally about 100°–102° C.; however, the rate of reaction will be increased by using higher temperatures or can be decreased by use of lower temperatures. Generally, the mole ratio of the sugar to the α, β-unsaturated polycarboxylic acid is about 0.5:1 to about 2:1, with about 0.5–1:1 being preferred. The concentrations of the reactants in the aqueous medium is generally not critical, although it is preferred to use concentrations of from about 0.5 molar to about 5 molar, with higher concentrations being preferred since the rate of reaction can be increased. Relatively short reaction times such as about one hour appear to give the best results.

It has been found that vigorous, high shear mixing provides a reaction product with the best activity. The by-product alkaline earth metal ions, such as calcium, can be removed by precipitation with soda ash and then filtration or by treatment with a cation exchange resin. Dissolving any excess lime with hydrochloric acid prior to the precipitation step may be convenient since calcium hydroxide is more difficult to filter out than is the carbonate. In a precipitation procedure, it is preferable to add an excess of sodium carbonate to effect the precipitation, to attain more effective removal of the divalent metal ions. When the intended use of the adduct is in detergent products, an excess of soda ash may be advantageous in the final formulation. Analysis of the product is carried out by NMR using an internal standard of potassium biphthalate and an external standard of tetramethylsilane. The products can be purified further, such as by recrystallization from aqueous ethanol or by precipitation from water with ethanol, or they can be used without isolation from the aqueous reaction solution after assaying to determine their concentration.

The following is a representative example of preparation of the compounds utilized in the formation of the sequestrant compositions of the invention:

EXAMPLE 1

Trisodium 2-Gluconoxysuccinate

To an equimolar mixture of 19.6 grams of maleic anhydride and 78.5 grams of a 50% aqueous gluconic acid solution dissolved in 90 ml. of water was added 26.3 grams of carbonate-free calcium hydroxide to pH 11.5. The mixture was refluxed for one hour while employing vigorous, high shear mixing. The resultant reaction product mixture was cooled to ambient temperature and 13 grams of 25% hydrochloric acid was added to pH 7. The mixture was heated to 85° C. and 41.1 grams of sodium carbonate was added and the mixture was stirred at 85° C. for 30 minutes. The precipitated calcium carbonate was removed by filtration at 85° C. The product was assayed by acid/base titration to determine its concentration and also titrated with EDTA to determine the residual Ca ion concentration.

Other compounds within the scope of this invention which may be prepared in accordance with the above-described procedure include:

TABLE A

| | Reactants | |
|---|---|---|
| Compound | Sugar | Unsat. Acid |
| trisodium (2-gluconoxy)(methyl)succinate | gluconic acid | citraconic acid |
| trisodium (2-gluconoxymethylenyl)succinate | gluconic acid | itaconic acid |
| tetrasodium (2-gluconoxy)propanetricarboxylate | gluconic acid | aconitic acid |
| tetrasodium (2-glucosaccharoxy)succinate | glucosaccharic acid | maleic acid |
| hexasodium (2,5-glucosaccharoxy)-bis-succinate | glucosaccharic acid | maleic acid (2 moles) |
| tripotassium (2-galactonoxy)succinate | galactonic acid | maleic acid |
| hexasodium (2,5-galactosaccharoxy)bis-succinate | galactosaccharic acid | maleic acid (2 moles) |
| trisodium (2-mannonoxy)succinate | mannonic acid | maleic acid |
| hexasodium (2,5-mannosaccharoxy)bis-succinate | mannosaccharic acid | maleic acid (2 moles) |
| trisodium (2-erythronoxy)succinate | erythronic acid | maleic acid |
| trisodium (2-threonoxy)succinate | threonic acid | maleic acid |
| trisodium (2-arabinonoxy)succinate | arabinonic acid | maleic acid |
| trisodium (2-xylonoxy)succinate | xylonic acid | maleic acid |
| trisodium (2-glucoheptonoxy)succinate | glucoheptonic acid | maleic acid |
| trisodium (2-glucooctonoxy)succinate | gluco-octonic acid | maleic acid |

The compounds are used in either the free acid form or as the water-soluble salts thereof, such as the sodium, potassium, ammonium, monoethanolammonium, diethanolammonium and triethanolammonium salts. The alkali metal salts are readily obtained such as by the procedures described herein or in U.S. Pat. No. 3,954,858. The ammonium and substituted ammonium salts are best obtained by first isolating the free acid form of the compound (by use of ion exchange or by acidification of the calcium salt with mineral acid and extraction with a suitable solvent) and then neutralization with the appropriate base or organic amine. The presently preferred compound is trisodium 2-gluconoxysuccinate.

The sequestrant compositions of this invention are prepared by combining the adduct compounds with the borate in a molar ratio of the compound to borate in the range of about 0.1 to about 5:1. The resultant complex can be formed prior to use as a sequestrant or can be formed in situ in an aqueous solution in which the sequestrant properties are utilized, such as in an aqueous laundry solution. A preferred molar ratio of compound to borate is about 0.2 to about 2:1.

Aqueous laundry solutions can include laundry detergent compositions in which a surfactant is present, for example the anionic and nonionic surfactants. Such aqueous laundry solutions can also include laundry bleaching solutions in which a perborate bleach is present. For example, sodium perborate may comprise the borate portion of the combination of this invention and provide bleaching properties thereto.

For laundering clothes, the concentration of the detergent composition (powdered or liquid) used in wash liquors ranges from about 0.05% to about 1% and more often from about 0.1% to about 0.8%. These ranges include both the washing concentrations used in the U.S. and Europe and cover both the older conventional formulations (e.g., 0.2–0.4 g/cc density powders) and the modern (Ultra) compact powders (0.6–1.0 g/cc density powders) and concentrated liquid formulations. Whether conventional or Ultra, the amounts of cleaning components such as surfactants and builders delivered to the wash solution are generally about the same. Builders, inorganic and organic, are present in the range of from 0–65% and more often 5–40% in the detergent composition. Organic sequestrant builders, such as citrate, are utilized at relatively low levels such as 2–20% because of cost. Also, liquids tend to use the lowest levels of builders and, in some cases, no builders at all. Representative detergent formulations which illustrate the use of the compositions of the present invention are given in the following examples.

EXAMPLE 2

| Ingredient | Weight Percent |
|---|---|
| trisodium 2-gluconoxysucccinate | 22.5 |
| sodium dodecyl benzene sulfonate | 14.5 |
| Neodol 45-13 | 9.2 |
| sodium tallowate | 3.0 |
| sodium carbonate | 15.0 |
| carboxymethyl cellulose | 0.2 |
| borax decahydrate | 11.3 |
| sodium silicate | 4.0 |
| EDTA (ethylenediamine tetraacetic acid) | 0.2 |
| enzyme | 0.5 |
| sodium sulfate/optical brightener | balance |

EXAMPLE 3

| Ingredient | Weight Percent |
|---|---|
| trisodium 2-gluconoxysuccinate | 10.5 |
| sodium dodecyl benzene sulfonate | 10.5 |
| Neodol 45-13 | 8.2 |
| sodium tallowate | 2.0 |
| zeolite A | 25.0 |
| sodium carbonate | 2.5 |
| acrylic/maleic copolymer Na salt | 3.0 |
| carboxymethyl cellulose | 0.2 |
| borax decahydrate | 5.3 |
| sodium silicate | 4.0 |
| EDTA | 0.2 |
| enzyme | 0.5 |
| sodium sulfate/optical brightener | balance |

EXAMPLE 4

| Ingredient | Weight Percent |
|---|---|
| trisodium 2-gluconoxysuccinate | 25.0 |
| sodium dodecyl benzene sulfonate | 2.0 |
| Neodol 45-13 | 8.0 |
| sodium tallowate | 3.0 |
| sodium carbonate | 10.0 |
| sodium perborate monohydrate | 5.0 |
| bleach activator | 3.0 |
| carboxymethyl cellulose | 0.2 |
| sodium metaborate | 11.5 |
| EDTA | 0.2 |
| sodium silicate | 4.0 |
| enzyme | 0.5 |
| sodium sulfate | balance |

EXAMPLE 5

| Ingredient | Weight Percent |
|---|---|
| trisodium 2-gluconoxysuccinate | 20.5 |
| sodium dodecyl benzene sulfonate | 15.0 |
| Neodol 23-6.5 | 8.0 |
| sodium citrate | 8.0 |
| sodium silicate | 3.0 |
| carboxymethyl cellulose | 0.1 |
| borax decahydrate | 10.3 |
| EDTA | 0.2 |
| enzyme | 1.2 |
| xylene sulfonate/ethanol/propylene glycol | 14.0 |
| water/foam regulator/optical brightener | balance |

Neodol 45-13 is a $C_{14-15}$ alcohol condensed with 13 moles of ethylene oxide, and Neodol 23-6.5 is a $C_{12-13}$ alcohol condensed with 6.5 moles of ethylene oxide.

EXAMPLES 6 TO 10

The following examples show use of the sequestrant compositions of this invention as builders in aqueous laundry solutions. The detergency of the solutions was determined on standard dust-sebum soil swatches (Scientific Services) in a laboratory Terg-O-Tometer. The laundry solution components were added to solutions containing various levels of calcium (0–500 ppm calcium carbonate) and the pH of the solution adjusted to 10.0. The soil load consisted of 4 dust-sebum soiled durable press swatches. The swatches were washed 10 minutes at 25° C. and then rinsed 5 minutes at 25° C. (Terg-O-Tometer speed 80 rpm.) Detergency was determined by measuring the change in reflectance. The following results were obtained with five surfactants in laundry solutions containing the sequestrant complexes of this invention. Sodium tripolyphosphate (STPP), Zeolite A and the gluconate/maleate adduct without the borate were also included in the test for comparison.

EXAMPLE 6

Surfactant: 0.15 g/l NaLAS +0.15 g/l Neodol 25-9

| | Detergency, Change in Reflectance (ppm $CaCO_3$) | | | | |
|---|---|---|---|---|---|
| Builder | 0 | 100 | 150 | 175 | 200 |
| 2 mM Gluconate-maleate<br>1 mM Sodium tetraborate | 32.1 | 27.3 | 27.6 | 26.8 | 26.6 |
| 2 mM Gluconate-maleate<br>4 mM Sodium perborate $H_2O$ | 31.3 | 27.9 | 28.1 | 27.2 | 27.7 |
| 2 mM Gluconate-maleate | 27.2 | 24.3 | 25.2 | 24.1 | 23.3 |
| 0.5 g/l STPP | 31.6 | 30.2 | 28.6 | 24.5 | 24.4 |
| 0.5 g/l Zeolite A | 20.3 | 22.7 | 20.2 | 23.2 | 21.8 |
| None | 15.9 | 22.2 | 18.7 | 21.9 | 21.6 |

EXAMPLE 7

Surfactant: 1.5 g/l NaLAS

| | Detergency, Change in Reflectance (ppm $CaCO_3$) | | | | |
|---|---|---|---|---|---|
| Builder | 0 | 200 | 300 | 400 | 500 |
| 8 mM Gluconate-maleate<br>4 mM Sodium tetraborate | 34.4 | 33.1 | 31.7 | 31.8 | 31.8 |
| 8 mM Gluconate-maleate<br>16 mM Sodium perborate $H_2O$ | 34.0 | 32.9 | 32.4 | 33.4 | 32.5 |
| 8 mM Gluconate-maleate | 32.0 | 29.3 | 31.0 | 31.1 | 29.2 |
| 2.0 g/l STPP | 34.4 | 31.7 | 31.8 | 31.9 | 31.3 |
| 2.0 g/l Zeolite A | 29.6 | 29.8 | 30.0 | 28.2 | 23.5 |
| None | 27.9 | 20.6 | 9.2 | 8.9 | 8.6 |

EXAMPLE 8

Surfactant: 0.44 g/l Sodium Laurate

| | Detergency, Change in Reflectance (ppm $CaCO_3$) | | | | |
|---|---|---|---|---|---|
| Builder | 0 | 100 | 150 | 175 | 200 |
| 2 mM Gluconate-maleate<br>1 mM Sodium tetraborate | 29.0 | 14.7 | 12.9 | 10.0 | 10.0 |
| 2 mM Gluconate-maleate<br>4 mM Sodium perborate $H_2O$ | 29.4 | 13.7 | 12.6 | 10.3 | 9.4 |
| 2 mM Gluconate-maleate | 15.1 | 10.1 | 10.1 | 8.2 | 7.7 |
| 0.5 g/l STPP | 24.1 | 16.3 | 17.8 | 13.2 | 13.1 |
| 0.5 g/l Zeolite A | 14.1 | 7.9 | 7.1 | 6.5 | 7.1 |
| None | 7.3 | 6.2 | 7.0 | 6.2 | 6.7 |

EXAMPLE 9

Surfactant: 0.30 g/l NaLAS

| | Detergency, Change in Reflectance (ppm $CaCO_3$) | | | | |
|---|---|---|---|---|---|
| Builder | 0 | 100 | 150 | 175 | 200 |
| 2 mM Gluconate-maleate<br>1 mM Sodium tetraborate | 34.1 | 28.6 | 25.7 | 23.6 | 25.2 |
| 2 mM Gluconate-maleate<br>4 mM Sodium perborate $H_2O$ | 33.5 | 28.3 | 26.0 | 24.6 | 23.7 |
| 2 mM Gluconate-maleate | 28.0 | 22.0 | 21.4 | 19.8 | 19.2 |
| 0.5 g/l STPP | 31.4 | 25.3 | 25.4 | 20.5 | 19.8 |
| 0.5 g/l Zeolite A | 12.7 | 18.3 | 17.0 | 12.5 | 13.2 |
| None | 9.5 | 12.6 | 9.8 | 7.7 | 7.9 |

EXAMPLE 10

Surfactant: 0.75 g/l NaLAS +0.75 g/l Neodol 25-9

| | Detergency, Change in Reflectance (ppm $CaCO_3$) | | | | |
|---|---|---|---|---|---|
| Builder | 0 | 200 | 300 | 400 | 500 |
| 8 mM Gluconate-maleate<br>4 mM Sodium tetraborate | 32.6 | 31.9 | 32.0 | 30.1 | 29.0 |
| 8 mM Gluconate-maleate<br>16 mM Sodium perborate $H_2O$ | 33.8 | 32.0 | 31.3 | 30.5 | 29.8 |
| 8 mM Gluconate-maleate | 31.6 | 30.2 | 31.5 | 31.2 | 34.0 |
| 2.0 g/l STPP | 34.3 | 31.0 | 32.2 | 31.1 | 32.3 |
| 2.0 g/l Zeolite A | 27.4 | 27.0 | 30.6 | 27.5 | 29.8 |
| None | 17.8 | 21.9 | 28.9 | 26.2 | 28.0 |

Gluconate-maleate is the adduct trisodium 2-gluconoxysuccinate; NaLAS is the anionic surfactant sodium dodecyl benzenesulfonate; and Neodol 25-9 is an alcohol ethoxylate nonionic surfactant—Shell Chemicals—C12/15 (EO)9.

EXAMPLE 11

In a similar test, the effect of the compound of Example 1 on the bleaching activity of sodium perborate was determined. A Terg-O-Tometer (80 rpm) was used with a 10-minute wash and 5-minute rinse at 50° C. using four tea-stained cotton muslin swatches. To a base detergent consisting of 10% Neodol 25-9 (alcohol ethoxylate nonionic surfactant—Shell Chemicals), 5% soda ash, and sodium sulfate equivalent to 1.5 grams/liter. The solution had a pH of 10. Stain removal was determined by change of reflectance as follows:

| Additive | Change in Reflectance |
|---|---|
| 0.40 g./l. sodium perborate monohydrate | 22.0 |
| 0.76 g./l. 2-gluconoxysuccinate<br>0.40 g./l. sodium perborate monohydrate | 22.1 |
| None | 5.2 |

As shown above, the presence of the 2-gluconoxysuccinate in the laundry bleach composition in which the perborate/adduct is used resulted in no deleterious effects.

EXAMPLE 12

The calcium complexing strength of the gluconate-maleate/borate complex of this invention was compared with that of the glucarate and tartrate/borate complexes of Heesen U.S. Pat. No. 4,000,083. The results were obtained by adding 20 millimolar $CaCl_2$ solution in 2 ml. increments to 100 ml. of a 2 millimolar solution of the chelant with the concentrations of borate indicated and also containing 10 millimolar potassium chloride as an ionic strength adjuster, measuring the resulting Ca ion concentration after each addition with a calcium ion electrode, and calculating the dissociation constant, assuming a 1:1 chelant:calcium complex. The following results were obtained:

TABLE B

| Chelant | Borate Conc. | $pK_{Ca}$ |
|---|---|---|
| Disodium saccharate | 0 | 2.6 |
| Disodium saccharate | 1 mM | 3.1 |
| Disodium saccharate | 2 mM | 3.5 |
| Disodium saccharate | 4 mM | 3.8 |
| Disodium tartrate | 0 | 2.6 |
| Disodium tartrate | 4 mM | 3.0 |
| Trisodium 2-gluconoxysuccinate | 0 | 3.3 |
| Trisodium 2-gluconoxysuccinate | 2 mM | 3.9 |
| Trisodium 2 gluconoxysuccinate | 4 mM | 4.4 |

In a test to compare the rate and strength of the complexing of calcium ions on the addition of calcium chloride to laundry detergent solutions containing the adduct/borate complexes of this invention and the adduct alone as the builder, it was found that the adduct/borate complexes reduce the calcium to lower levels than obtained with the adduct alone.

EXAMPLE 13

The effectiveness of various builders for inhibiting the deposition of iron oxide powder on cotton swatches, was determined by measuring the total reflectance of the swatches after treatment with the builder. Increasing reflectance indicates a reduction in iron oxide deposited on the fabric and therefore better performance of the builder as an anti-deposition agent. A 0.04 gram amount of powdered iron oxide (Krona red—Pfizer Inc.) was added to a Terg-O-Tometer bucket containing 1 liter of a builder solution. The builder solutions consisting of deionized water with a builder added at the concentrations indicated in Table C and adjusted to pH 10 with sodium hydroxide. The resulting suspension was agitated in the Terg-O-Tometer bath at a temperature of 40° C. for five minutes prior to adding four 3-inch×3-inch square swatches of cotton cloth. The cloth swatches were agitated in the builder solutions for 30 minutes. They were then removed from the builder solutions and dried and the total reflectance values of the dried swatches were measured on a HunterLab D25 PC-2A Colorimeter. The reflectance was measured on the "y" scale.

TABLE C

DEPOSITION OF IRON OXIDE

| Builder A | Concentration of A (mM) | Builder B | Concentration of B (mM) | Total Reflectance |
|---|---|---|---|---|
| Sodium borate | 4 mM | None | 0 | 54.6 |
| Sodium citrate | 0.5 g/l | None | 0 | 63.6 |
| None | 0 | None | 0 | 66.0 |
| GLS | 2 mM | None | 0 | 82.7 |
| STPP | 0.5 g/l | None | 0 | 84.6 |
| Sodium borate | 4 mM | GLS | 2 mM | 86.8 |

The results indicate that GLS (trisodium 2-gluconoxysuccinate) performed reasonably well as an anti-deposition agent, with a total reflectance almost as high as STPP (sodium tripolyphosphate), while sodium borate was ineffective with a total reflectance value substantially lower than when no builder was used at all. However the combination of borate with GLS gave GLS a significant boost in its effectiveness for anti-deposition of iron oxide, resulting in a total reflectance value which was better than STPP, which is considered the industry standard.

EXAMPLE 14

The soil dispersing properties of various builders were measured based on the suspension of kaolin clay and red iron oxide pigment. Effective soil dispersants keep soil particles finely divided in aqueous suspensions and result in a tightly compacted, low volume sediment layer after an extended period of settling. By contrast, ineffective dispersion allows soil particles to flocculate together in the suspension and results in a lower density, higher volume sediment layer upon settling.

A 5-ml volume of powdered pigment (kaolin clay or iron oxide) was added to 100 ml of builder solution (see Tables D and E for builder concentrations) in demineralized water adjusted to pH 10 and transferred to a graduated measuring cylinder. The cylinder was then stoppered, shaken and allowed to settle for 24 hours at 40° C. At the end of the 24-hour settling period the volume of the pigment sediment layer was measured. These results are shown in Tables D and E.

TABLE D

SUSPENSION OF KAOLIN CLAY

| Builder A | Concentration of A (mM) | Builder B | Concentration of B (mM) | 24-Hour Sediment Volume (ml) | 24-Hour Sediment Volume (%) |
|---|---|---|---|---|---|
| None | 0 | None | 0 | 5.0 | 100 |
| Sodium borate | 4 mM | None | 0 | 5.0 | 100 |
| Sodium citrate | 0.5 g/l | None | 0 | 1.5 | 30 |

TABLE D-continued

| SUSPENSION OF KAOLIN CLAY | | | | | |
|---|---|---|---|---|---|
| Builder A | Concentration of A (mM) | Builder B | Concentration of B (mM) | 24-Hour Sediment Volume (ml) | 24-Hour Sediment Volume (%) |
| GLS | 2 mM | None | 0 | 1.25 | 25 |
| Sodium borate | 4 mM | GLS | 2 mM | 1.0 | 20 |
| STPP | 0.5 g/l | None | 0 | 0.5 | 10 |

TABLE E

| SUSPENSION OF IRON OXIDE | | | | | |
|---|---|---|---|---|---|
| Builder A | Concentration of A (mM) | Builder B | Concentration of B (mM) | 24-Hour Sediment Volume (ml) | 24-Hour Sediment Volume (%) |
| None | 0 | None | 0 | 5.0 | 100 |
| GLS | 2 mM | None | 0 | 5.0 | 100 |
| Sodium borate | 4 mM | None | 0 | 5.0 | 100 |
| Sodium borate | 4 mM | GLS | 2 mM | 4.0 | 80 |
| Sodium citrate | 0.5 g/l | None | 0 | 4.0 | 80 |
| STPP | 0.5 g/l | None | 0 | 2.5 | 50 |

The results in Tables D and E indicate that GLS (trisodium 2-gluconoxysuccinate) was reasonably effective as a soil dispersing agent with kaolin clay but was ineffective with iron oxide, whereas sodium borate was ineffective as a soil dispersant in both cases, resulting in no decrease in the 24-hour sediment volumes compared with the absence of any builder. However, the combination of sodium borate and GLS gave results which are significantly better than obtained with either of the components alone.

Various changes and modifications of the invention can be made and, to the extent that such variations incorporate the spirit of this invention, they are intended to be included within the scope of the appended claims.

We claim:

1. An aqueous laundry solution containing a sequestrant composition for alkaline earth and transition metal ions comprising:

(1) a sodium tetraborate and (2) at least one compound of the formula:

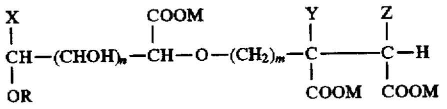

wherein R is H or

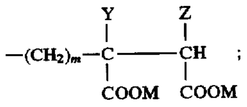

X is H or COOM; m is 0 or 1; n is an integer of from 1 to 4; M is hydrogen or an alkali metal or ammonium cation; and Y and Z are independently selected from the group consisting of H, lower alkyl containing 1 to 4 carbon atoms, —COOM and —$CH_2$COOM, said compound having at least two hydroxy groups in a vicinal configuration, wherein the mole ratio of said compound to said sodium tetraborate is about 0.1 to about 5:1, said sequestrant composition in combination with a surfactant.

2. A sequestrant composition according to claim 1 in which said sodium tetraborate is selected from the group consisting of sodium tetraborate pentahydrate and sodium tetraborate decahydrate.

3. A sequestrant composition according to claim 1 in which said compound is selected from the group consisting of 2-gluconoxysuccinic acid and the water soluble salts thereof.

4. A sequestrant composition according to claim 3 in which said compound is trisodium 2-gluconoxysuccinate.

5. A sequestrant composition according to claim 1 in which said mole ratio is about 0.2 to about 2:1.

* * * * *